United States Patent
Chua

(10) Patent No.: US 9,013,835 B2
(45) Date of Patent: Apr. 21, 2015

(54) LOW TRANSLATIONAL LOAD SUSPENSION ASSEMBLY

(75) Inventor: Paul Y. Chua, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/273,746

(22) Filed: Oct. 14, 2011

(65) Prior Publication Data

US 2013/0094106 A1 Apr. 18, 2013

(51) Int. Cl.
G11B 5/55 (2006.01)
G11B 21/08 (2006.01)
G11B 5/56 (2006.01)
G11B 5/48 (2006.01)

(52) U.S. Cl.
CPC ............ *G11B 5/4833* (2013.01); *G11B 5/5569* (2013.01)

(58) Field of Classification Search
USPC ............... 360/265.7, 265.9–266.1, 244.2, 360/244.8–245, 245.7, 294.3–294.6
See application file for complete search history.

(56) References Cited

U.S. PATENT DOCUMENTS

| | | | | |
|---|---|---|---|---|
| 5,936,803 A * | 8/1999 | Berding | | 360/244.8 |
| 6,122,139 A * | 9/2000 | Sri-Jayantha et al. | | 360/99.16 |
| 6,920,018 B2 | 7/2005 | Oh et al. | | |
| 6,958,879 B2 | 10/2005 | Oh et al. | | |
| 6,961,221 B1 * | 11/2005 | Niu et al. | | 360/294.4 |
| 7,006,335 B2 * | 2/2006 | Kuwajima et al. | | 360/294.4 |
| 7,023,667 B2 * | 4/2006 | Shum | | 360/294.3 |
| 7,136,260 B2 | 11/2006 | Oh et al. | | |
| 7,265,945 B2 * | 9/2007 | Ueno et al. | | 360/245.5 |
| 7,277,258 B2 | 10/2007 | Hirano et al. | | |
| 7,468,865 B2 * | 12/2008 | Yang et al. | | 360/244.2 |
| 7,502,191 B2 | 3/2009 | Oh et al. | | |
| 7,595,964 B2 | 9/2009 | Oh et al. | | |
| 8,107,198 B1 * | 1/2012 | Ee | | 360/245.7 |
| 2001/0021086 A1 * | 9/2001 | Kuwajima et al. | | 360/294.4 |
| 2002/0063999 A1 * | 5/2002 | Huang et al. | | 360/265.7 |
| 2003/0039074 A1 * | 2/2003 | Erpelding | | 360/244.2 |
| 2004/0095672 A1 * | 5/2004 | Price | | 360/78.12 |
| 2005/0013056 A1 * | 1/2005 | Kuwajima et al. | | 360/294.4 |
| 2005/0099736 A1 * | 5/2005 | Utsunomiya | | 360/294.4 |
| 2006/0285256 A1 * | 12/2006 | Hirano et al. | | 360/294.3 |
| 2007/0014052 A1 * | 1/2007 | Kim et al. | | 360/265.7 |
| 2008/0144224 A1 * | 6/2008 | Yao | | 360/245.4 |
| 2008/0180846 A1 | 7/2008 | Hirano | | |
| 2009/0027807 A1 * | 1/2009 | Yao et al. | | 360/245.1 |
| 2010/0097728 A1 * | 4/2010 | Koganezawa | | 360/294.4 |
| 2010/0134928 A1 * | 6/2010 | Nojima et al. | | 360/294.4 |

* cited by examiner

*Primary Examiner* — Adam B Dravinninkas
(74) *Attorney, Agent, or Firm* — HolzerIPLaw, PC

(57) ABSTRACT

Implementations described and claimed herein address the foregoing problems by providing a suspension assembly used in a storage device to support a transducer head, wherein the suspension assembly comprises a base plate for attaching to an actuator arm and a moving portion movably attached to the base plate. The base plate is fixed and/or clamped to the actuator arm and the moving portion adapted to rotate about a center of rotation. The moving portion is adapted to have a center of mass of its moving mass substantially close to its center of rotation. In one implementation, a counter-weight is attached to the moving portion to move the center of mass of its moving mass substantially close to its center of rotation to minimize inertial loads to the system during suspension actuation.

7 Claims, 8 Drawing Sheets

LOW TRANSLATIONAL LOAD SUSPENSION ASSEMBLY

BACKGROUND

Storage devices such as a magnetic disk drive storage device ("disk drive") incorporate a read/write transducer-carrying head that is designed to fly closely above the surface of a spinning magnetic disk medium during drive operation. The transducer is mounted to a free end of a suspension assembly that in turn is cantilevered from the arm of a rotary actuator mounted on a stationary pivot shaft. The suspension assembly has a base plate end that attaches to the actuator arm and a load beam that extends from the base plate to the free end of the suspension assembly where the transducer-carrying head is mounted on a flexure that allows it to actuate about a center of rotation. Position control of the transducer relative to data tracks on the spinning magnetic disk medium is limited by the inertial excitation loads induced in the actuator arm as the head is actuated by the suspension actuator assembly. Such torque and lateral loads results in rotational and lateral displacement of the actuator arm respectively, causing a lateral displacement of the transducer-head. Such displacements can cause disturbances that are problematic to servo control of the transducer-head.

SUMMARY

Implementations described and claimed herein address the foregoing problems by providing a suspension assembly used in a storage device to support a transducer head, wherein the suspension assembly comprises a base plate for attaching to an actuator arm and a moving portion movably attached to the base plate. The base plate is fixed and/or clamped to the actuator arm and the moving portion adapted to rotate about a center of rotation. The moving portion is adapted to have a center of mass of its moving mass substantially close to its center of rotation. In one implementation, a counter-weight is attached to the moving portion to move the center of mass of its moving mass substantially close to its center of rotation.

These and various other features and advantages will be apparent from a reading of the following detailed description.

BRIEF DESCRIPTIONS OF THE DRAWINGS

A further understanding of the nature and advantages of the various implementation disclosed herein may be realized by reference to the figures, which are described in the remaining portion of the specification.

DETAILED DESCRIPTIONS

Figure 1:
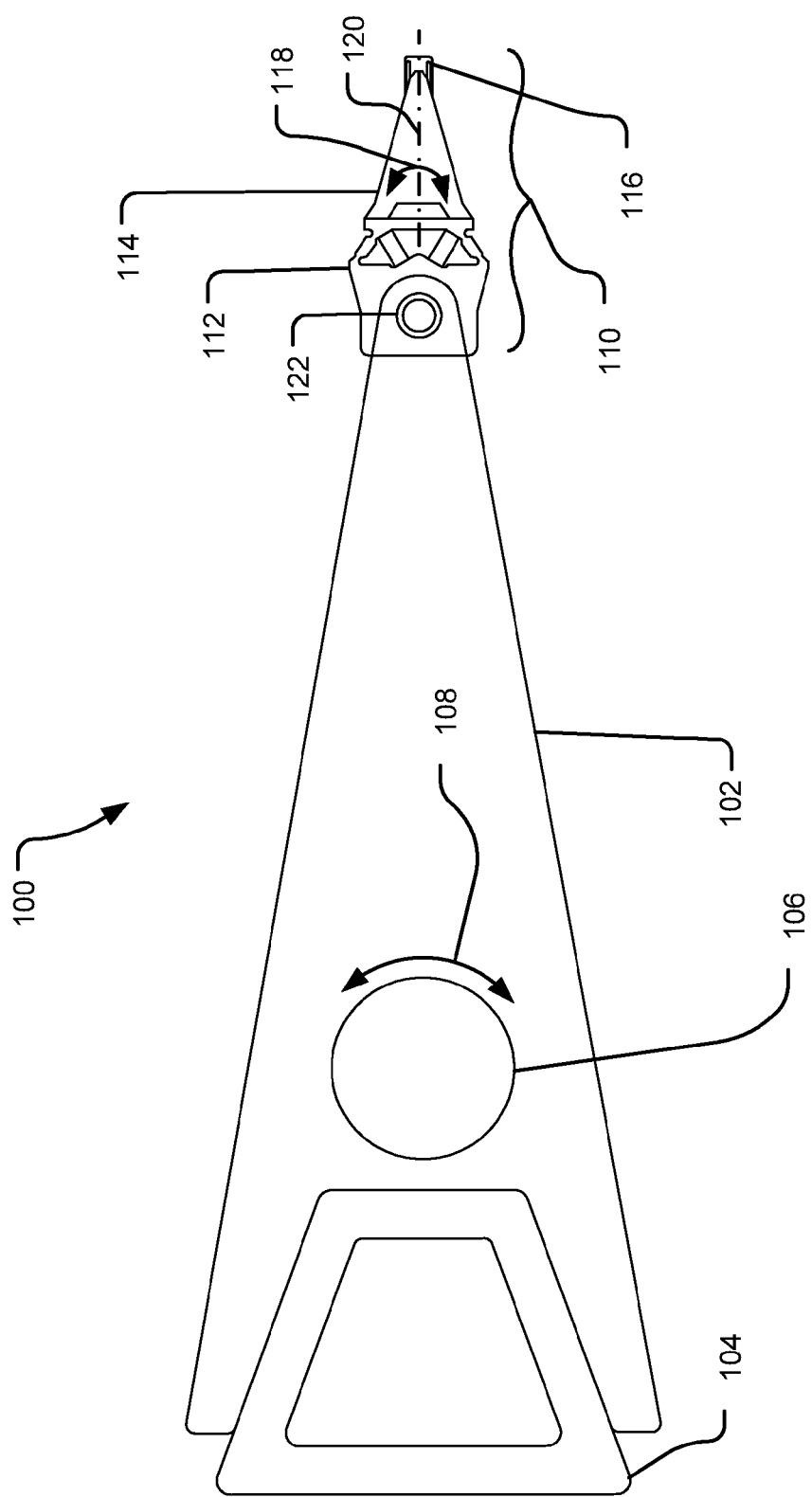
FIG. 1 illustrates a top view of an example actuator arm assembly including a suspension assembly.

FIG. 1 illustrates a top view of an example actuator arm assembly 100. In one implementation, the actuator arm assembly 100 is used with a data storage device. Such data storage devices include, for example, a magnetic data storage device. The actuator arm assembly 100 includes an actuator arm 102 having a voice coil 104 that is used to actuate the actuator arm assembly 100. The actuator arm 102 is attached to a storage device assembly through a pivot bearing located at a primary actuator pivot location 106 such that the actuator arm 102 can pivot about the primary actuator pivot location 106. The actuator arm assembly 100 also includes a secondary suspension level actuator assembly 110 that is mounted on the actuator arm 102. The suspension assembly includes a base plate 112 and a load beam 114. A transducer head 116 is attached to one end of the load beam 114. The transducer head 116 is used to hold a read, write or a read/write transducer that reads and/or writes data from storage media. In one implementation, such a transducer is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensors.

Providing the actuator arm assembly 100 with the actuator arm 102 and the secondary suspension actuator assembly 110 allows increasing track-positioning resolution of the actuator arm assembly 100. In one implementation, the actuator arm 102 is adapted to swivel around the actuator pivot location 106 in both clockwise and counter-clockwise direction 108. Similarly, the load beam 114 of the secondary suspension actuator assembly 110 is also adapted to swivel in both clockwise and counter-clockwise direction 118. The swivel movement 118 of the load beam 114 is around a center of rotation located on a centerline 120 passing through the center of a suspension assembly attachment point 122.

In one implementation, during actual operation of the actuator arm assembly 100 for any given operation, when the actuator arm 102 swivels in the clock-wise direction, the load beam 116 swivels in the counter-clockwise operation. In an alternate implementation, both the actuator arm 102 and the load beam 116 swivel in the same direction for an operation, with the displacements of the actuator arm 102 and the load beam 116 being out of phase with each other. In one implementation, two secondary suspension actuator assemblies 110 are attached to the actuator arm, with an upper suspension assembly adapted to read/write data from a disk surface above and a lower suspension assembly adapted to read/write data from a disk surface below. The timing and the actuation direction of each of the upper suspension assembly and the lower suspension assembly may be slightly off from each other. In a yet alternate implementation, the swivel movements of the actuator arm 102 and the load beam 116 are both in opposite directions and out of phase with each other.

Actuation of the suspension assembly induces translational inertial (or off-track) and rotational inertial loads on the actuator arm assembly. In an out of phase implementation, the inertial loads induce torque about the longitudinal axis, the axis passing through the center of the actuator pivot location 106 and the center of the suspension assembly attachment point 122. In an in-phase implementation, the translational loads induce translational (in the direction of the stroke) loads to the actuator arm assembly 100. In one implementation of the actuator arm assembly 100, the load beam 114 is adapted to have a center of mass of a moving mass of the secondary suspension actuator assembly 110 (referred to hereinafter as the "moving mass") closer to its center of rotation so that the combined loads due to rotational torque and lateral force disturbances do not cause unintended displacement of the transducer head 116. As a result, an overshoot or undershoot of the transducer head 116 may be substantially zero. For example, a weight is attached to the load beam 114 at a location between a center of rotation of the load beam 114 and the suspension assembly attachment point 122 so that the center of mass of the moving mass is substantially closer to the center of rotation. The location and the amount of the counter-weight are decided based on required reduction in reaction force along one or more axes. When the center of mass of the moving mass and the center of rotation approach collocation, the inertial loads to the system (translational or rotational) are minimized. The manipulation of the center of mass of the moving mass by a weight attached to the load beam 114 is used to shift the center of rotation away from the transducer enabling increased stroke while taking advantage of the minimized inertial loads to the system due to the actuation of the secondary suspension assembly 110.

Figure 2:
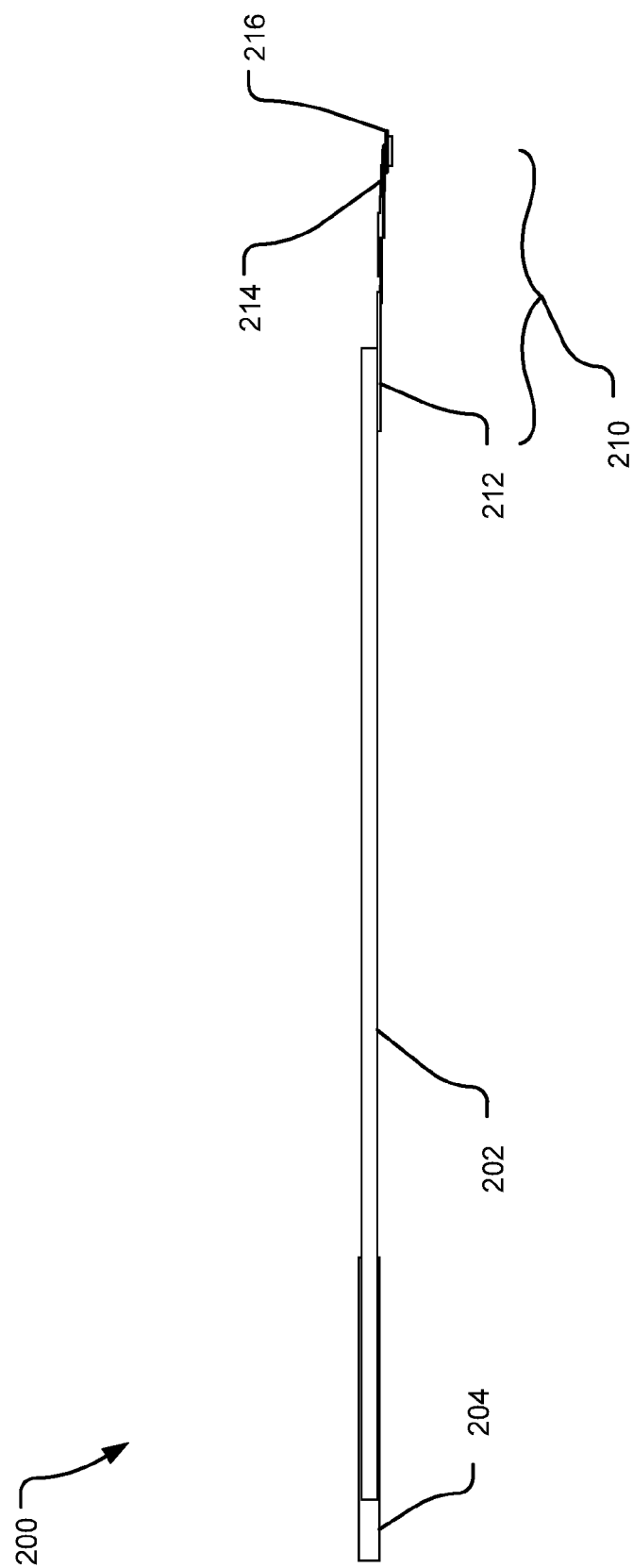
FIG. 2 illustrates a side view of an example actuator arm assembly including a suspension assembly.

FIG. 2 illustrates a side view of an example actuator arm assembly 200. The actuator arm assembly 200 includes an actuator arm 202 that is attached to a storage device assembly such that the actuator arm 202 can pivot about a primary actuator pivot location (not shown). A voice coil 204 is used to actuate the actuator arm assembly 200. The actuator arm assembly 200 also includes a suspension assembly 210 that is mounted on the actuator arm 202. The suspension assembly 210 includes a base plate 212 and a load beam 214. A transducer head 216 is attached to one end of the load beam 214. The transducer head 216 is used to hold a read, write or a read/write transducer that reads and/or writes data from storage media.

Figure 3:
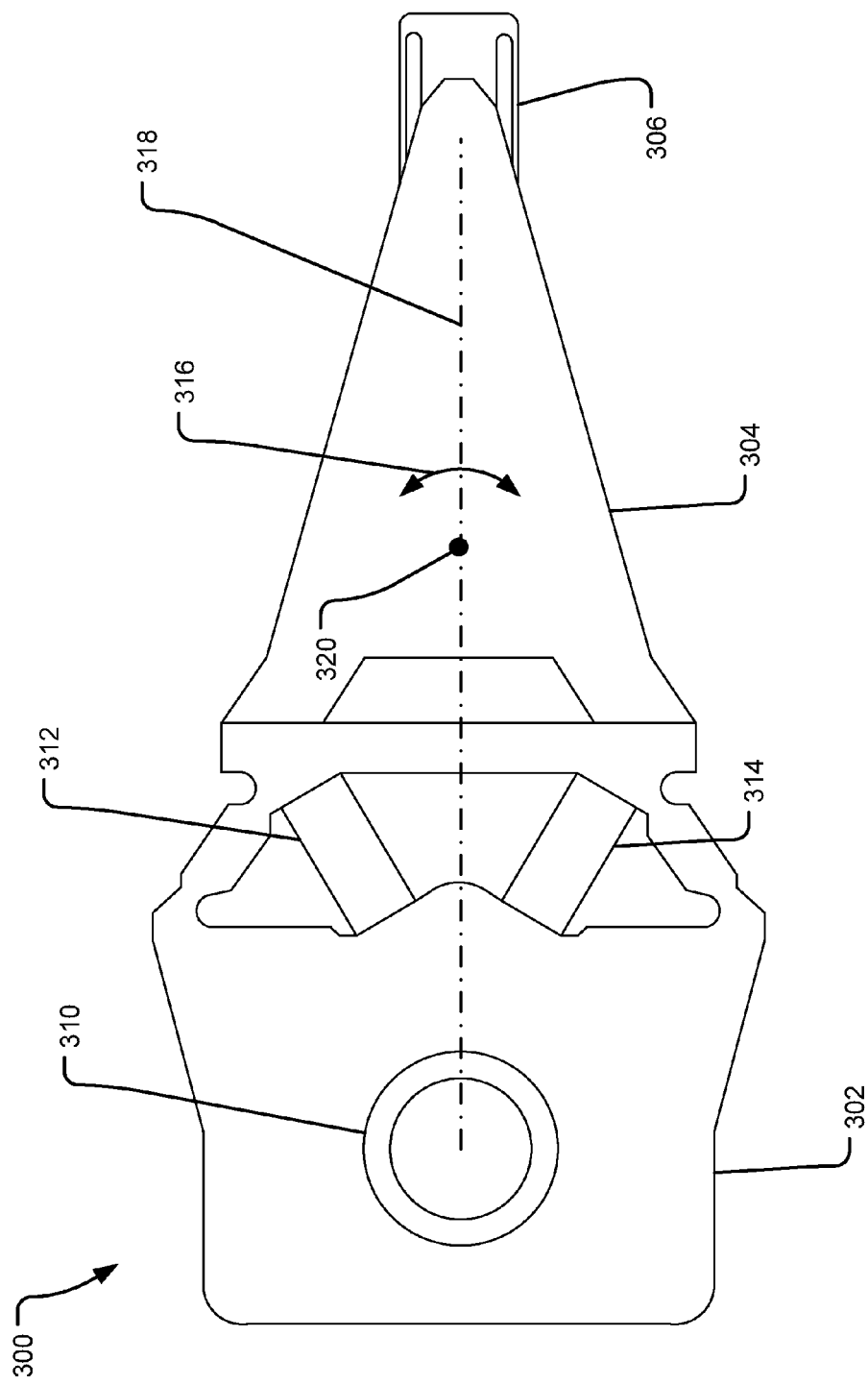
FIG. 3 illustrates a top view of an example suspension assembly.

FIG. 3 illustrates a top view of an example suspension assembly 300. The suspension assembly 300 includes a base plate 302 that is used to attach the suspension assembly 300 to an actuator arm. In one implementation, the base plate 302 is swage-mounted to an actuator arm using a swage-spud 310 at its mount place end to be connected to a swage hole in the actuator arm.

In one implementation, the actuators 312 and 314 are piezoelectric actuators constructed using single or multilayer ceramic piezoelectric actuator materials. However, in alternate implementation, a single piezoelectric actuator can also be used. In one implementation, the actuators 312 and 314 are of opposite polarization in order to simplify the electrical connections thereto. For example, in one implementation, one side of each actuators 312, 314 is shorted to the base plate 302 using conductive epoxy or the like while the other side is wire stitched to an extra power lead. When a voltage differential is applied, one of the actuators 312, 314 is polarized to elongate longitudinally while the other actuator is designed to contract longitudinally. As used herein, the term "longitudinally" refers to the longitudinal dimension of the suspension assembly 300 extending from the base plate 302 through the transducer head 306. While the implementation disclosed in FIG. 3 illustrates the actuators 312, 314 being non-parallel to each other, in an alternate implementation the actuators 312, 314 are parallel to each other. Moreover, while the implementation of FIG. 3 shows that the actuators 312, 314 do not overlap the suspension assembly attachment point 310 longitudinally, in an alternate implementation the actuators 312, 314 are located to longitudinally overlap the suspension assembly attachment point 310. In other words, in an alternate implementation, the suspension assembly attachment point 310 is closer to the load beam 304 than illustrated in FIG. 3.

In one implementation, the load beam 304 is attached to the base plate 302 in accordance with a four-bar linkage mechanism. The four-bar linkage mechanism allows a control mechanism to locate the center of rotation. The elongation and contraction of the actuators 312, 314 provides for clockwise and counter-clockwise rotation 316 of the load beam 304. The center of rotation of the load beam 304 is located on a longitudinal axis 318. In one implementation, the center of mass of the moving mass is also located on the longitudinal axis 318 and it is located substantially close to the center of rotation. For example, in the implementation illustrated in FIG. 3, the center of rotation and the center of mass of the moving mass are both located at the same location 320. In an alternate implementation, the center of mass of the moving mass is located towards the base plate 302 or towards the transducer head 306 as compared to the center of rotation.

In an implementation, the load beam 304 is designed with a mass distribution such that the center of mass of the moving mass is substantially close to its center of rotation. However, in an alternate implementation, a counter-weight is attached to the load beam 304 at a location between its center of rotation and the base plate 302 such that the effective center of mass of the moving mass is substantially close to its center of rotation. Because the counter-weight is attached to the load beam to the left of the center of rotation 320, i.e., towards the base plate 302 from the center of rotation 320, the counter-weight will displace in a direction opposite the translational direction of the transducer head 306. The counter-weight (not shown here) attached to the load beam 304 may be located above the load beam 304 or below the load beam 304. In one implementation, the location where the counter-weight is attached to the load beam 304, and weight of the counter-weight is based on, among other things, the desired center of rotation location of the actuator arm. Specifically, the location and the weight of the counter-weight are determined so that the forces generated by the angular accelerations of the counter weight and the load beam 304 substantially cancel out each other.

In an alternative implementation, the counter-weight is movably attached to the load beam 304. In such an implementation, the position of the counter-weight can be varied along the longitudinal axis 318 between the center of rotation 320 and the base plate 302. For example, in one implementation the location of the counter-weight can be moved along the axis 318 towards or away from the center of rotation based on a seek signal being executed by the actuator assembly.

Figure 4:
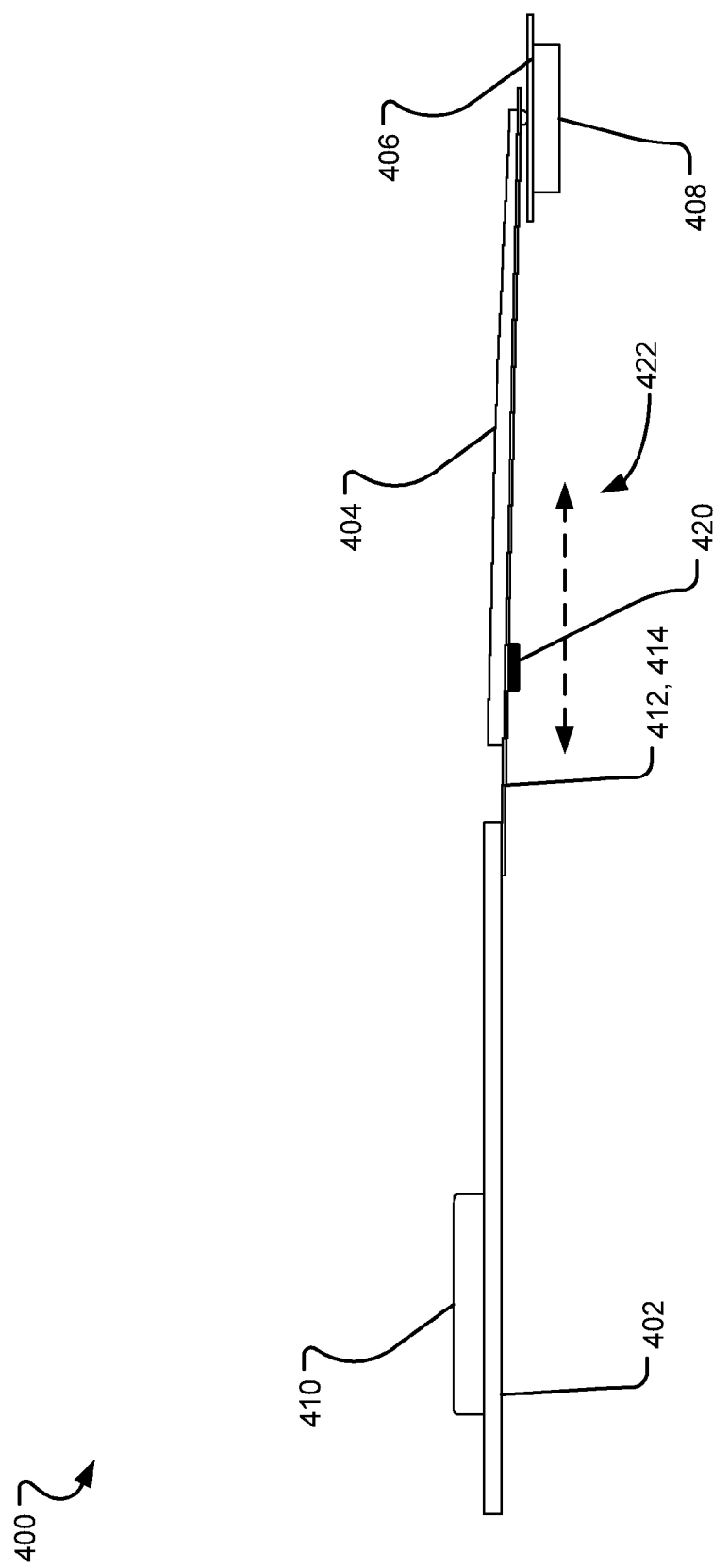
FIG. 4 illustrates a side view of an example suspension assembly.

FIG. 4 illustrates a side view of an example suspension assembly 400. The suspension assembly 400 includes a base plate 402 attached to an actuator arm at a suspension assembly attachment point 410. A load beam 404 is movably attached to the base plate 402 via a suspension level actuation 412. A transducer head 406 is attached to the load beam 404. The transducer head 406 includes a transducer 408 that can read/write data from a storage media, such as tracks of a disk drive.

The suspension assembly 400 includes a counter-weight that is attached to the bottom of the load beam 404. The location 422 of the counter-weight 420 along the length of the load beam 404 is determined based on calculation of one or more inertial loads on the suspension assembly 400 and the current location of the center of rotation and the center of mass of the suspension assembly 400. While the implementation of FIG. 4 shows the counter-weight 420 attached to the bottom of the load beam 404, in an alternative implementation, the counter-weight 420 is attached to the top, side or other location on the load beam 404. In one implementation, the counter-weight 420 is part of the base plate 402.

Figure 5:
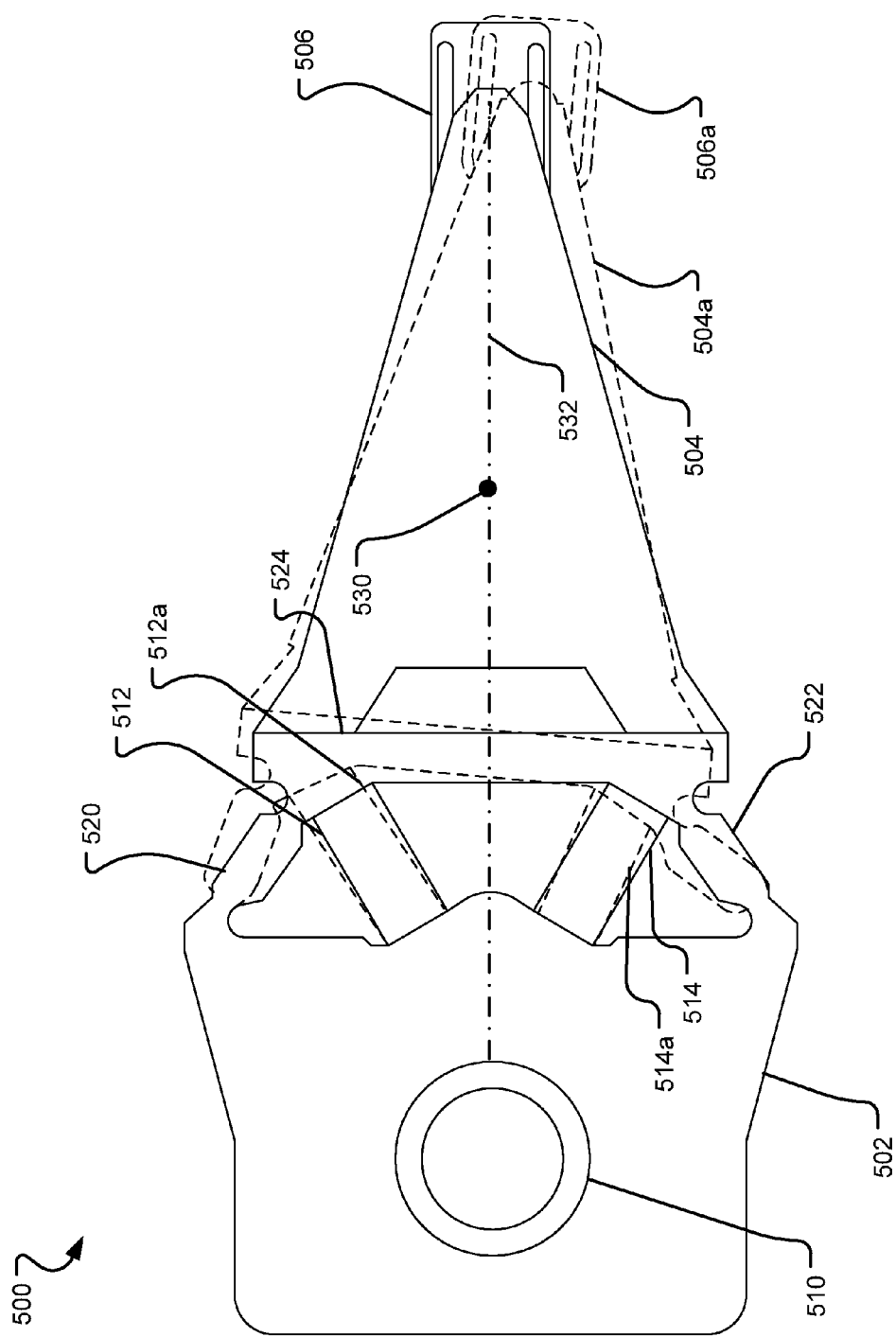
FIG. 5 illustrates a top view of an example micro-actuation of a suspension assembly.

FIG. 5 illustrates a top view of an example micro-actuation of a suspension assembly 500. The suspension assembly 500 includes a base plate 502 that is attached to an actuator arm of an actuator assembly at a suspension assembly attachment point 510. The suspension assembly 500 also includes a load beam 504, a first actuator 512, and a second actuator 514. In one implementation, the load beam 504 is attached to the base plate 502 in a manner so that when the actuators are actuated, a part of the base plate 502 moves together with the load beam 504. For example, in the implementation illustrated in FIG. 5, a first arm 520, a second arm 522, and a connecting bar 524 are part of the base plate 502 and the load beam 504 such that when an excitation signal is applied to the first actuator 512 and the second actuator 514, a first arm 520, a second arm 522, and a connecting bar 524 move (or flex) together with the load beam 504.

A transducer head 506 is attached to the load beam 504, wherein the transducer head 506 includes a transducer (not shown) that reads and/or writes data from a storage device such as a magnetic disk drive. The implementation of the suspension assembly 500 illustrates a micro-actuation of the suspension assembly 500 in response to an activation signal that causes the load beam 504 to rotate around its center of rotation 530. In the illustrated implementation, the center of rotation 530 is located on an axis 532. Due to the micro-actuation, the load beam 504 rotates to a new location as illustrated by 504a and the transducer head 506 rotates to a new location as illustrated by 506a.

The rotation of the load beam 504 is caused by the expansion of the first actuator 512 to 512a and the contraction of the second actuator 514 to 514a. To cause the movement of the suspension assembly 500 to the opposite direction, the actuators 512 and 514 are given excitation signals so that the first actuator 512 contracts and the second actuator 514 expands. The excitation of the actuators 512 and 514, together with the movement of the actuator arm to which the suspension assembly attaches causes the movement of the transducer on the transducer head 506 to a desired location. In some circumstances, the simultaneous movement of the actuator arm and the suspension assembly 500 induces torque about the longitudinal axis 532 and/or forces in the direction of the transducer stroke, which results in additional displacement of the transducer head 506. Such rotational displacement can be problematic to the precise servo control of the transducer head 506.

In an implementation of the suspension assembly 500, a counter-weight is attached to the load beam 504 so that the center of mass of the moving mass is substantially close to the center of rotation 530 of the load beam 504. In an implementation, the counter-weight is attached to the load beam 504 along the longitudinal axis 532 at a location between the center of rotation 530 and the suspension assembly attachment point 510.

Figure 6:
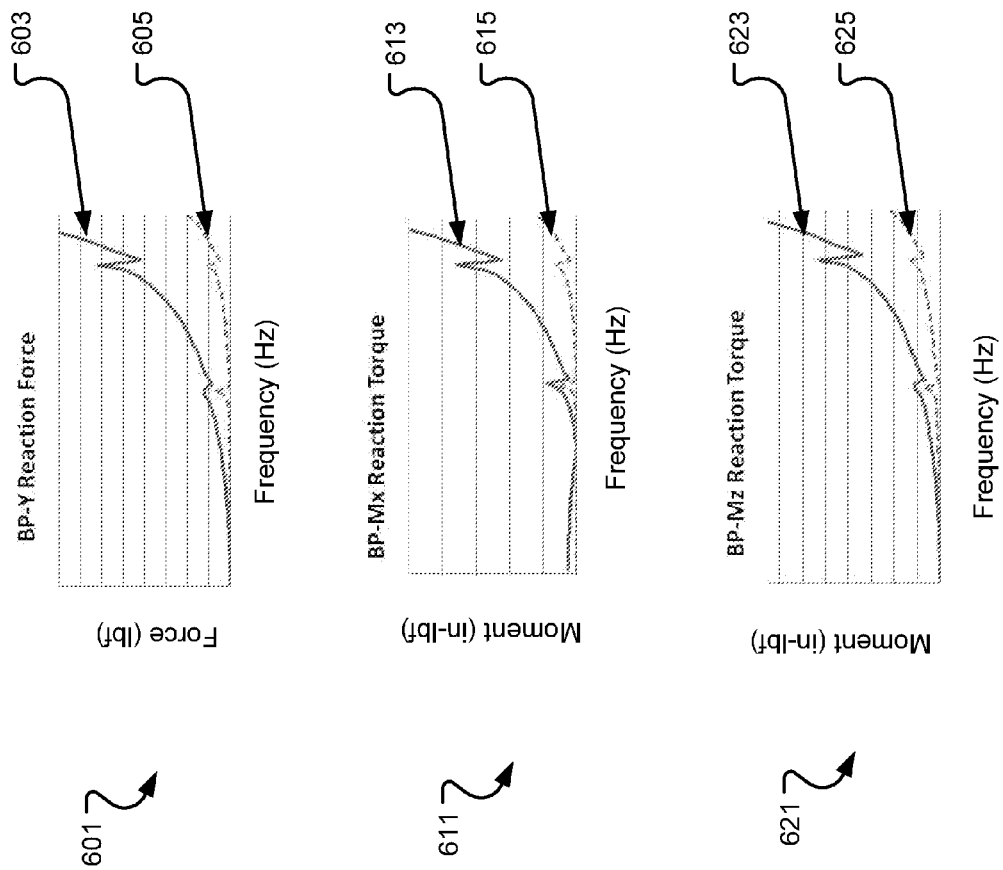
FIG. 6 illustrates example graphs illustrating improved reaction forces and torques.

FIG. 6 illustrates example graphs illustrating improved lateral force and/or rotational torque due to moving the center of rotation substantially close to the center of mass of the moving mass. Graph 601 discloses base plate reaction force in the Y direction, i.e., along a direction perpendicular to the longitudinal axes 318, 532. Specifically, graph 601 illustrates such reaction force along the Y direction at various frequencies of rotational movement of the suspension assembly. Line 603 of graph 601 illustrates such reaction force with a suspension with actuation without moving the center of mass of the moving mass substantially close to the center of rotation. On the other hand, line 605 of graph 601 illustrates such reaction force after moving the center of mass of the moving mass substantially close to its center of rotation.

Graph 611 discloses base plate reaction torque along the X direction, i.e., along the longitudinal axes 318, 532. Specifically, graph 611 illustrates such reaction torque along the X direction at various frequencies of rotational movement of the suspension assembly. Line 613 of graph 611 illustrates such reaction torque with a conventional suspension with actuation without moving the center of mass of the moving mass substantially close to the center of rotation. On the other hand, line 615 of graph 611 illustrates such reaction torque after moving the center of mass of the moving mass substantially close to its center of rotation.

Similarly, a graph 621 discloses base plate reaction torque along the Z direction, i.e., along a direction that is orthogonal to both the X direction and the Y direction as described above. Specifically, graph 621 illustrates such reaction torque along the Z direction at various frequencies of rotational movement of the suspension assembly. Line 623 of graph 621 illustrates such reaction torque with a suspension with actuation without moving the center of mass of the moving mass substantially close to the center of rotation. On the other hand, line 625 of graph 621 illustrates such reaction torque after moving the center of mass of the moving mass substantially close to its center of rotation.

As illustrated by the graphs 601, 611, and 621 above, aligning the center of mass of the moving mass to the center of rotation as disclosed herein reduces the reaction forces and torques along each axes substantially resulting in reduced combined inertial loads applied to the actuator arm attached to the suspension assembly. Such reduction of the forces results in lower lateral and/or rotational displacement of the transducer head, which in turn results in better precision for servo control of the transducer head.

Figure 7:
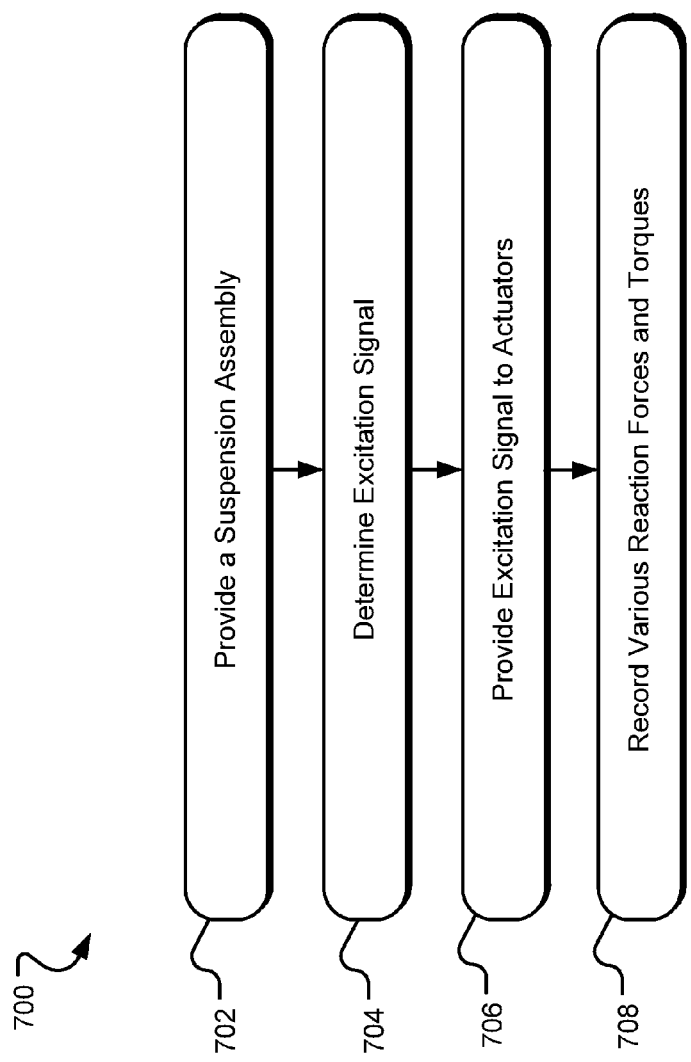
FIG. 7 illustrates example operations illustrating use of a suspension assembly disclosed herein.

FIG. 7 illustrates example program 700 with operations for using the suspension load assembly disclosed herein. An implementation of the program 700 allows software, firmware or a circuit to perform one or more operations of the program 700. A providing operation 702 provides a suspension assembly that has a counter-weight attached to its load beam. In one implementation, the location and the weight of the counter-weight is such that the center of rotation of the suspension assembly and the center of mass of the suspension assembly are substantially close to each other. In one implementation, the location and weight of the counter-weight is such that the center of rotation of the suspension assembly and the center of mass of the moving mass are substantially close to each-other. The counter-weight functions to move the center of mass of the moving mass towards the base plate to increase stroke as the center of rotation follows it.

The information about the whole suspension assembly structure together with the information about the counter-weight and the location of the counter-weight, and inertial information about the suspension assembly is provided to a servo-controller that controls the movement of the suspension assembly. A determination operation 704 uses such information together with a transfer function of the structure that generates an excitation signal based on such information to determine the excitation signal that is required for a given displacement of the transducer-head. In one implementation, the servo controller uses such information to determine the distance between the center of rotation of the suspension assembly and the center of mass of the moving mass of the suspension assembly. In one implementation, the location of the counter-weight is determined dynamically.

Subsequently, an excitation operation 706 provides an excitation signal to the actuators attached to the suspension assembly. In one implementation, the excitation signal causes one of the actuators to expand and another of the actuators to contract. Such coordinated expansion and contraction of the actuators cause the suspension moving mass to rotate about its center of rotation, causing a transducer-head to radially move along rotational media, such as a magnetic disk.

A recording operation 708 records various reaction forces and/or torques generated along one or more axes. In one implementation, the force generated along the Y-axis of the base plate and the torques generated along the X-axis and the Z-axis of the base plate is recorded. Such recorded information is used by the determination operation 704 during subsequent uses of the suspension assembly. In one implementation, where the location of the counter-weight is dynamically determined, the information recorded during the recording operation is also used to determine the location of the counter-weight during subsequent uses of the suspension assembly.

Figure 8:
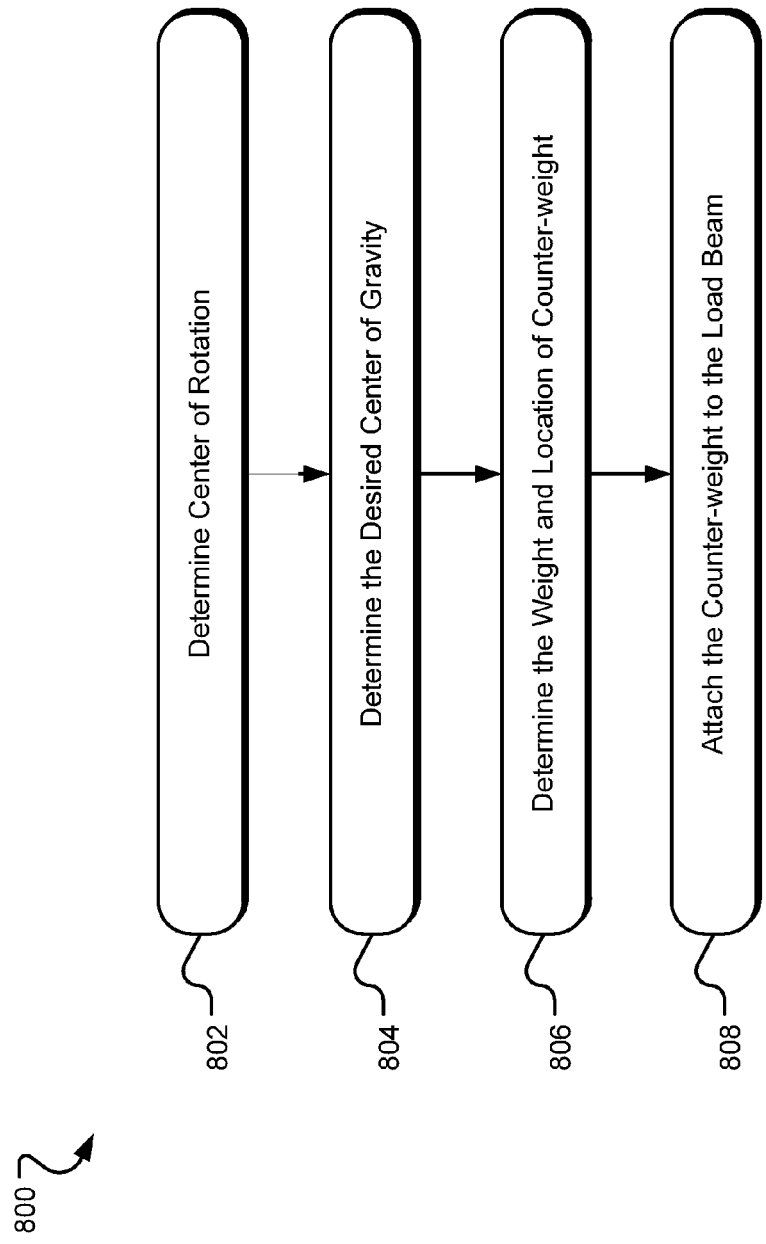
FIG. 8 illustrates example operations for manufacturing a suspension assembly disclosed herein.

FIG. 8 illustrates example program 800 with operations for manufacturing of the suspension assembly disclosed herein. An implementation of the program 800 allows software, firmware or a circuit to perform one or more operations of the program 800. A determination operation 802 determines the center of rotation of the load beam of the suspension assembly. The center of rotation is determined based on the length of the load beam and the length of the actuators used to move the load beam. In one implementation, an algorithm using parameters of a four bar linkage (not shown here) implementation of the suspension assembly is used to determine the center of rotation of the load beam. In an alternate implementation, empirical data based on actual movement of the load beam are used to determine the center of rotation.

Subsequently, a determination operation 804 determines the desired location of the center of mass of the moving mass. In one implementation, the desired location of the center of mass is determined based on information about forces and torques along various axes, where such information is determined based on a number of simulations for the movement of the suspension assembly at various frequencies. Subsequently the desired location of the center of mass is determined based on simulations with the center of mass located at a number of different locations along the longitudinal axis of the suspension assembly. In one implementation, the center of mass is determined to be located at the center of rotation.

A determination operation 806 determines the weight and the location of a counter-weight that is required to be attached to the load beam of the suspension assembly so that the center of mass of the load beam is at the determined location according to operation 804. In an implementation, a number of combinations of the weight and the location of a counter-weight are available, wherein one such combination is determined based on an alternate criterion, such as energy expended in moving the suspension assembly, the noise generated in moving the suspension assembly, etc. For example, in one implementation, the location and the weight of the counter-weight is determined so as to generate a desired profile of force/torque along an axis for a range of frequencies.

An attaching operation 808 attaches the counter-weight manufactured as per the weight and location determined by the determination operation 806 to the load beam of the suspension assembly. The counter-weight is attached to the load beam using one of a number of different mechanisms, including, welding, screw-in, etc. The method of attaching a counter-weight to the load beam depends on the material used for the load-beam, the material used for the counter-weight, expected wear and tear on the suspension assembly, the flexibility desired for removing the counter-weight, etc.

Various implementations described herein are implemented as logical steps in one or more computer systems. The logical operations are implemented (1) as a sequence of processor-implemented steps executing in one or more computer systems and (2) as interconnected machine or circuit modules within one or more computer systems. In one implementation, one or more of the operations disclosed herein are implemented using a processor. For example, a processor attached to a servo controller that controls the movement of the suspension assembly is used to implement one or more steps of various operations disclosed herein. The implementation is a matter of choice, dependent on the performance requirements of the computer system used for implementation. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example implementations. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A storage device, comprising:
   a servo controller adapted to control the movement of an actuator arm; and
   a suspension assembly attached to the actuator arm having a baseplate and a load beam, the suspension assembly moveably attached to the baseplate; and
   a counterweight moveably attached to the load beam that can be moved toward or away from a center of rotation of the load beam based on a seek signal of the storage device, wherein the center of rotation of the load beam is substantially close to a center of mass of the load beam.

2. The storage device of claim 1, wherein the suspension assembly further comprises a counter-weight attached to the load.

3. The storage device of claim 2, wherein the counter-weight is attached to the load beam at a location such that combined inertial load applied to the actuator arm is zero.

4. The storage device of claim 2, wherein the servo controller is further adapted to use inertial information about the suspension assembly to determine a distance between the center of rotation of the suspension assembly and a center of mass of the load beam.

5. The storage device of claim 2, wherein the counter-weight is attached to the load beam at a location between the center of rotation and the base plate.

6. The storage device of claim 1, wherein the servo controller is further adapted to provide an excitation signal to the at least two actuators attached to the suspension assembly.

7. The storage device of claim 1, wherein the center of mass of the suspension assembly is located at the center of rotation of the suspension assembly.

* * * * *